United States Patent
Bock

(10) Patent No.: US 7,086,275 B2
(45) Date of Patent: Aug. 8, 2006

(54) MEANS FOR DETECTING A LEAK

(75) Inventor: Eberhard Bock, Morlenbach (DE)

(73) Assignee: Carl Freudenberg KG, Weinheim (DE)

( * ) Notice: Subject to any disclaimer, the term of this patent is extended or adjusted under 35 U.S.C. 154(b) by 196 days.

(21) Appl. No.: 10/812,407

(22) Filed: Mar. 26, 2004

(65) Prior Publication Data
US 2004/0232619 A1    Nov. 25, 2004

(30) Foreign Application Priority Data
Apr. 1, 2003    (DE) ................................ 103 14 924

(51) Int. Cl.
*G01M 3/04* (2006.01)
*G01M 3/16* (2006.01)
*F16J 15/00* (2006.01)

(52) U.S. Cl. .......................... 73/40; 277/317; 277/320

(58) Field of Classification Search .................... 73/40; 277/317, 320
See application file for complete search history.

(56) References Cited

U.S. PATENT DOCUMENTS 4,505,186 A * 3/1985 Meier et al. .................. 92/5 R
6,626,436 B1 * 9/2003 Pecht et al. .................. 277/317

FOREIGN PATENT DOCUMENTS

DE      10061111 A * 7/2002 .................. 277/320

* cited by examiner

*Primary Examiner*—Daniel S. Larkin
(74) *Attorney, Agent, or Firm*—Harness, Dickey & Pierce, P.L.C.

(57) ABSTRACT

A sealing system for sealing a machine element, preferably a shaft, with at least one sealing ring and a depot for absorbing a leak. The system is monitored with a measuring device that includes a condenser, and the depot serves as a dielectric.

16 Claims, 6 Drawing Sheets

MEANS FOR DETECTING A LEAK

CROSS-REFERENCE TO RELATED APPLICATIONS

This application claims the benefit of German Patent Application 103 14 924.4, filed Apr. 1, 2003. The disclosure of the above application is incorporated herein by reference.

FIELD OF THE INVENTION

The invention relates to means for detecting a leak.

BACKGROUND OF THE INVENTION

Different seals are known for sealing shaft passages. Radial shaft sealing rings, slide ring seals, and the like are widely used and their use areas are considerable. A common aspect of all seals, however, is that they are subject to wear and once they have lost their sealing function, they must be replaced. In such cases, leaks that develop must be prevented because, in many applications, they can cause major damage. Hence, the need exists for timely detection of an undesirable leak of a liquid or a gas so that the defective seal may be replaced.

A system for detecting a leak at a seal is known from DE 100 61 111 A1. The leak detection system of DE 100 61 111 A1 includes a depot for storing the leaked material and a sensor based on an optical principle. The sensor transmits a signal when the optical properties of the depot change as a result of the depot being covered by the leaked liquid.

SUMMARY OF THE INVENTION

The object of the invention is to provide a sealing system wherein the means for detecting a leak are usable at higher temperatures.

This objective is reached by designing a measuring device as a condenser with a leak-absorbing depot as a dielectric. As a result, the sealing system can be exposed to substantially higher temperatures.

In one embodiment, the condenser plates can consist of support rings, for example two installed sealing rings. The use of the support rings as condenser plates is space-saving.

In another embodiment, the condenser plates are formed by electrically conductive covering layers on two circular sides of the depot. A conductive covering layer can be applied to the depot in a simple and inexpensive manner.

The conductive covering layers can be arranged in segments distributed over the depot and connected to each other conductively or non-conductively. By an appropriate arrangement of several segments, the leak can be located by appropriate measurements.

Preferably, the depot is an absorbent and/or swellable circular disk. The circular configuration allows optimal utilization of the available space.

The depot can be made of a porous material. As a result of their large surface, porous materials can absorb the leaked material.

The depot preferably consists of an absorbent and/or swellable polymer. Polymeric materials are inexpensive.

The depot can be made of a nonwoven fabric. Nonwoven fabrics are inexpensive and easy to process.

In one embodiment, a temperature sensor is disposed in the sealing system. By a temperature measurement, the effects of temperature on the dielectric behavior of the leaked material and the depot can be compensated.

The leak can be detected by measuring the condenser capacity. To this end, the change in dielectric properties of the depot is a measure of the saturation of the depot with the leaked material, and is determined by measuring the condenser capacity.

The leak can also be detected by "dielectric spectroscopy", whereby the dielectric behavior of the leaked material and the depot is determined via a frequency. Here, the change in dielectric properties of the depot is also a measure of depot saturation with the leaked material, but this method also determines a leak when the dielectric constants of the leaked material and the depot are similar.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
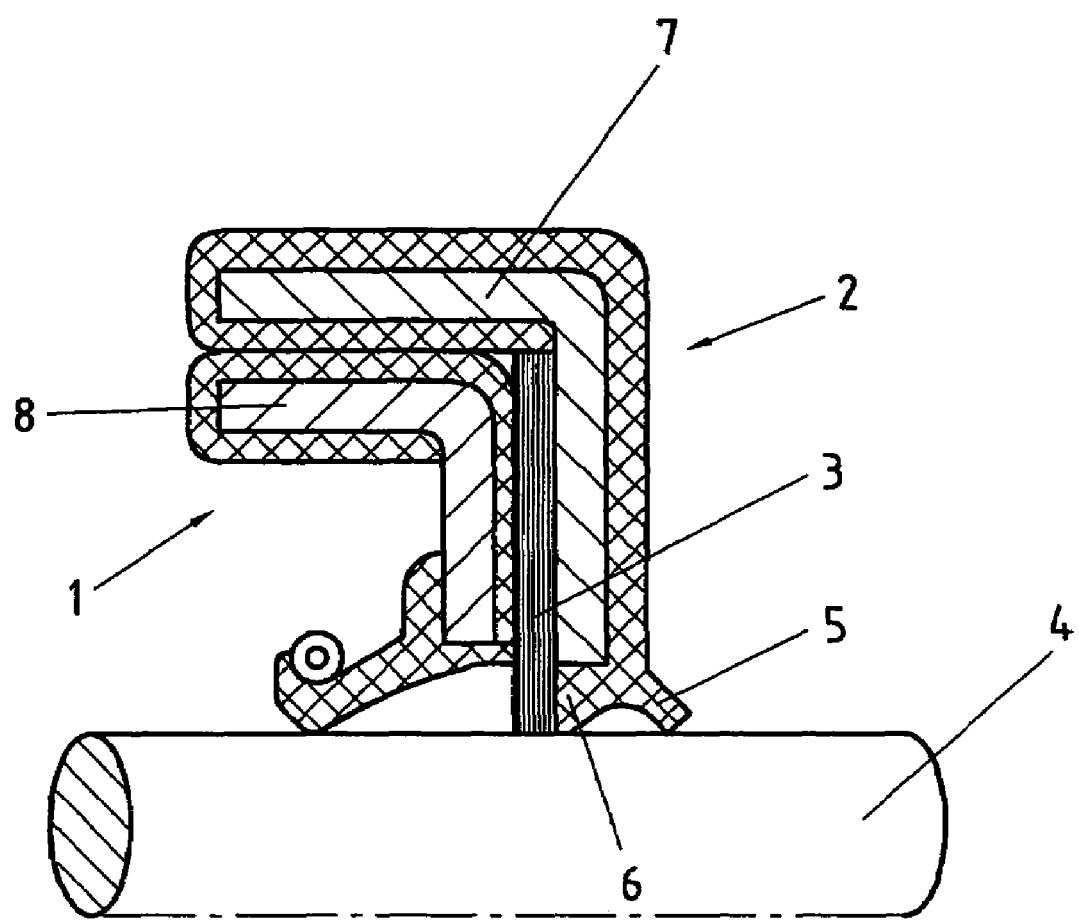
FIG. 1 shows in longitudinal cross-section a sealing system with two radial shaft sealing rings and one depot according to a principle of the present invention.

FIG. 1 shows a sealing system wherein a sealing ring 1 is pressed into a sealing ring 2. A depot 3 is disposed radially between the two sealing rings 1 and 2. The depot 3 consists of a disk of nonwoven fabric that touches the shaft 4 to be sealed. The sealing ring 2 that faces the surroundings has two sealing lips 5 and 6 that form an annular space. This space can be filled with a lubricant to prevent premature wear of outer sealing ring 2. The condenser plates are formed by the two support rings 7 and 8. The depot 3 is disposed between these support rings 7 and 8, and forms a dielectric.

Figure 2:
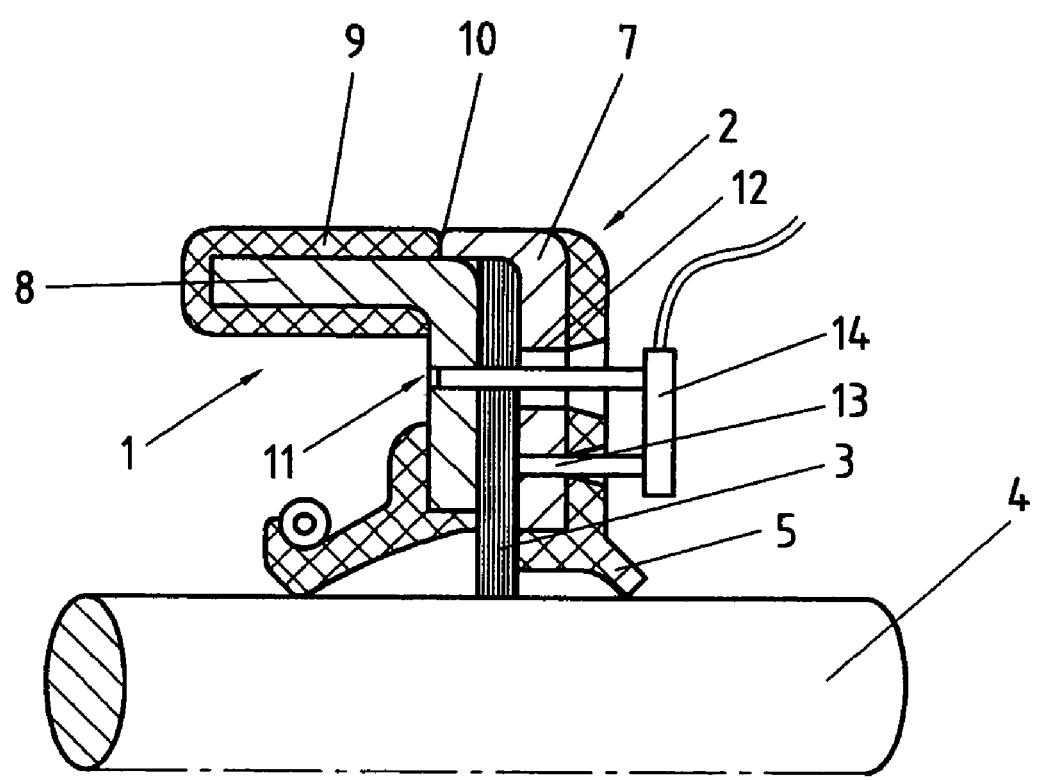
FIG. 2 shows a sealing system with a device for acquiring measured values according to a principle of the present invention.

FIG. 2 shows a sealing system wherein the sealing ring 2 that is oriented toward the surroundings is slipped onto a side of sealing ring 1 that faces the surroundings. For mounting purposes, the outer, static sealing region 9 is provided with a recess 10 to which the support ring 7 is fastened. Here, too, the condenser plates are formed by the support rings 7 and 8 of the sealing rings 1 and 2. The depot 3 is disposed between the support rings 7 and 8, and constitutes the dielectric. The depot 3 is a circular disk with an inner diameter that is larger than the diameter of the shaft 4. The depot 3, therefore, absorbs only dripping or spun-off leaks. Further, the support rings 7 and 8 are provided with holes 11, 12 and 13 into which is inserted a plug 14. The upper hole 12 of outer sealing ring 2 has a larger diameter to ensure that the support rings 7 and 8 are not short-circuited through the plug 14.

Figure 3:
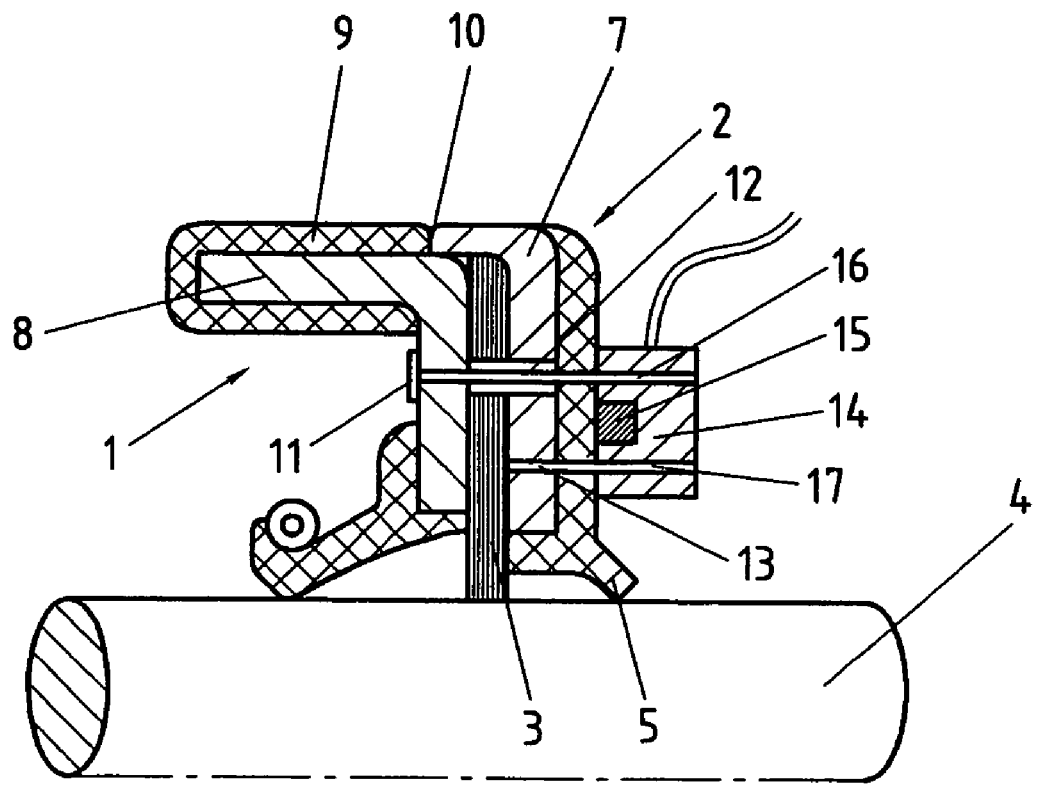
FIG. 3 shows another sealing system with a device for acquiring measured values according to a principle of the present invention.

FIG. 3 shows a sealing system essentially as that of FIG. 2. The measured values are recorded via pins 16 and 17 which are fastened and sealed in holes 11 and 13. A plug 14 is slipped onto pins 16 and 17, wherein the plug contains a measuring element 15 for temperature determination intended for compensation of the effects of temperature on the results of the measurement.

Figure 4:
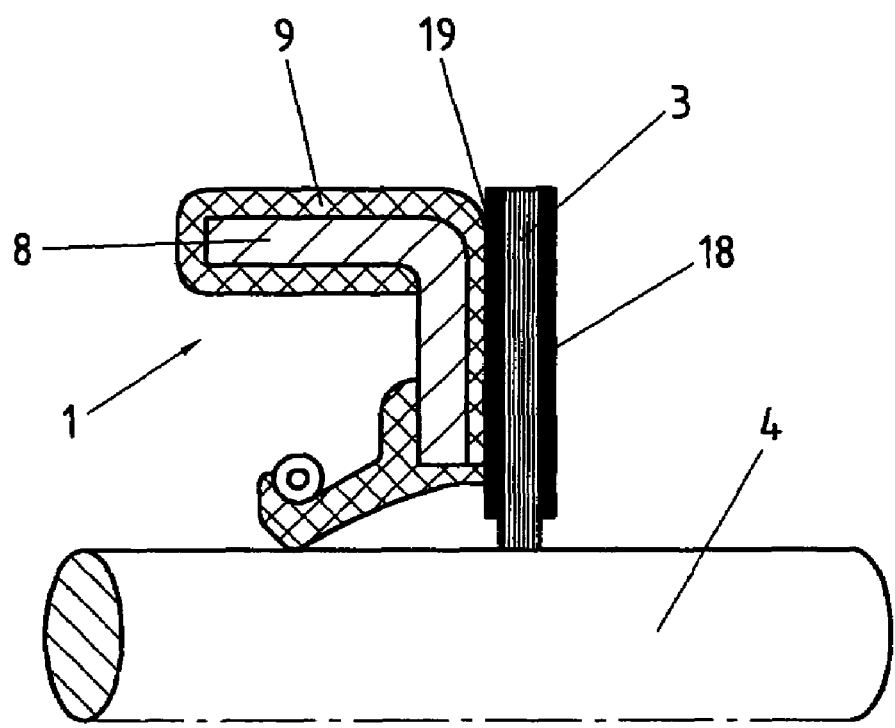
FIG. 4 shows a sealing system with a depot having an electrically conductive covering layer applied to each side thereof according to a principle of the present invention.

FIG. 4 shows a sealing system with a sealing ring 1 and a depot 3 that is fastened to a side of the sealing ring 1 that faces the surroundings. On the two circular sides of the depot 3, provided as condenser plates, are covering layers 18 and 19 that are made of an electrically conductive material. To prevent a short circuit in the covering layers 18 and 19, the covering layers are not completely applied to depot 3, but in a region of shaft 4, are provided with a circular recess.

Figure 5:
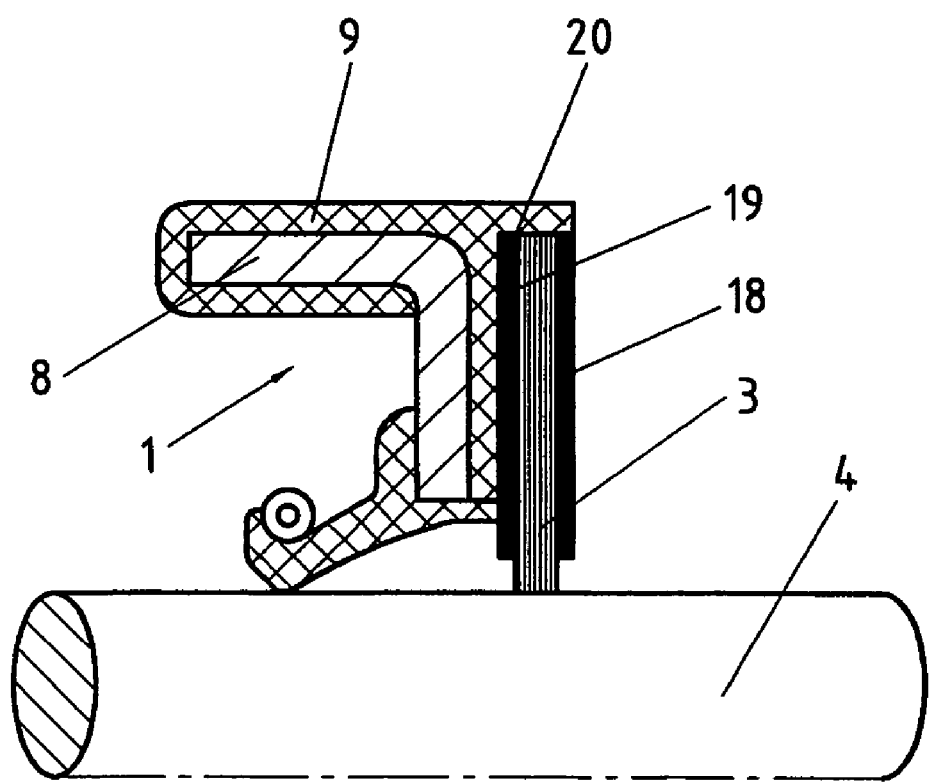
FIG. 5 shows a sealing system with a depot having an electrically conductive covering layer applied to each side thereof, the depot being centered in the sealing ring according to a principle of the present invention.

FIG. 5 shows a sealing system similar to the sealing system shown in FIG. 4. The depot 3 with covering layers 18 and 19 is centered in a recess 20 of an outer static sealing region 9 of sealing ring 1.

Figure 6:
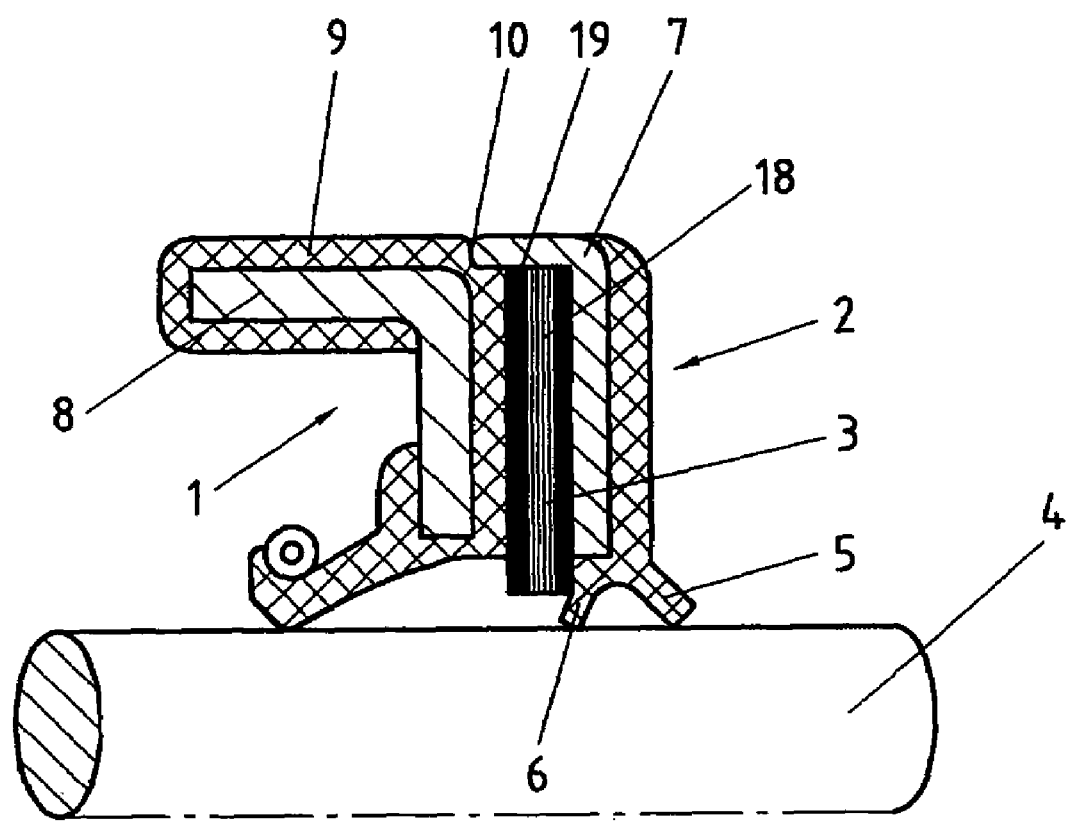
FIG. 6 shows a sealing system with two radial shaft sealing rings and a depot with an electrically conductive covering layer according to a principle of the present invention.

FIG. 6 shows a sealing system with two sealing rings 1 and 2 between which is radially disposed a depot 3 with covering layers 18 and 19. The arrangement of the sealing rings is the same as that shown in FIG. 2. The depot 3 has a larger diameter than the shaft 4. The covering layers 18 and 19 are applied to the entire circular surface of the depot 3. In this manner, the depot 3 with covering layers 18 and 19 is a readily-fabricated, die-cut part. Sealing in the direction of the surroundings is provided by two sealing lips 5 and 6, as described in FIG. 1.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A sealing system for sealing a machine element comprising at least one sealing ring and a depot for absorbing a leak, said system being monitored with a measuring device, wherein the measuring device includes a condenser and the depot serves as a dielectric.

2. The sealing system according to claim 1, wherein the condenser includes condenser plates formed of electrically conductive support rings by two mounted sealing rings.

3. The sealing system according to claim 1, wherein the condenser includes condenser plates formed of electrically conductive covering layers on two circular sides of the depot.

4. The sealing system according to claim 3, wherein the covering layers are distributed over the depot in segments, said segments connected to each other conductively or nonconductively.

5. The sealing system according to claim 1, wherein the depot is formed of an absorbent and/or swellable circular disk.

6. The sealing system according to claim 1, wherein the depot comprises a porous material.

7. The sealing system according to claim 1, wherein the depot comprises an absorbent and/or swellable polymer.

8. The sealing system according to claim 1, wherein the depot is comprises a nonwoven fabric.

9. The sealing system according to claim 1, wherein the sealing system further comprises a temperature sensor.

10. A method for measuring the quantity of leaked material for a sealing system according to claim 1, wherein a change in dielectric properties of the depot represents a measure of saturation of said depot with a leaked material, said change being determined by measuring the condenser capacity.

11. A method for measuring the quantity of leaked material for a sealing system according to claim 1, wherein a change in dielectric properties of the depot is determined by dielectric spectroscopy.

12. A leak detection system comprising:
a first sealing ring and a second sealing ring, said first and second sealing rings including a condenser plate;
a depot disposed between said first and second sealing rings acting as a dielectric; and
a temperature measuring element;
wherein said depot absorbs a leaking material and said leaking material absorbed by said depot changes a dielectric property of said depot that is measured by said condenser plates.

13. The leak detection system according to claim 12, wherein said depot comprises a porous material.

14. The leak detection system according to claim 12, wherein said change in dielectric property of the depot is measured by the condenser plates by a change in the capacity of the condenser plates.

15. The leak detection system according to claim 12, wherein said condenser plates comprise electrically conductive covering layers disposed on a plurality of sides of the depot.

16. The leak detection system according to claim 12, wherein the temperature measuring element determines a temperature of the leaked material and compensates an effect of the temperature on a result of the measurement.

* * * * *